United States Patent [19]

Vlasak

[11] Patent Number: 5,170,110
[45] Date of Patent: Dec. 8, 1992

[54] REGULATOR MECHANISM FOR A TWO-SPEED MOTOR

[75] Inventor: Robert C. Vlasak, Dallas, Tex.

[73] Assignee: Lennox Industries Inc., Carrollton, Tex.

[21] Appl. No.: 509,040

[22] Filed: Apr. 12, 1990

Related U.S. Application Data

[62] Division of Ser. No. 199,205, May 26, 1988, Pat. No. 4,947,098.

[51] Int. Cl.⁵ .............................................. H02P 7/43
[52] U.S. Cl. ..................................... 318/775; 318/777
[58] Field of Search .................................. 318/773-777

[56] References Cited

U.S. PATENT DOCUMENTS 4,947,098 8/1990 Vlasak ............................ 318/775

Primary Examiner—David Smith, Jr.
Attorney, Agent, or Firm—Allegretti & Witcoff, Ltd.

[57] ABSTRACT

An improved regulator mechanism for a single-phase or three-phase, two-speed motor is disclosed. The regulator mechanism includes a first energizable contactor (having at least one contact) and a second energizable contactor (having five contacts) which cooperate to cycle the motor between inoperative and operative states and to configure the motor windings and power lines so as to provide first and second speed operation.

5 Claims, 2 Drawing Sheets

REGULATOR MECHANISM FOR A TWO-SPEED MOTOR

This is a divisional application of Ser. No. 07/199,205 filed May 26, 1988, now U.S. Pat. No. 4,947,098 issued Aug. 7, 1990.

BACKGROUND OF THE INVENTION

The present invention relates generally to a regulator for an apparatus including a two-speed motor and a controller for requesting motor operation, and more particularly to an improved regulator for an air conditioning unit including a single-phase or three-phase, two-speed compressor.

Numerous regulating mechanisms of this type are presently available. One such mechanism for an air conditioning system is amply described in U.S. letters Pat. No. 3,935,519 (issued Jan. 27, 1976 and hereinafter "the Pfarrer patent"), and attention is specifically but without limitation directed to FIGS. 1, 2, 6 and 7 and column 3, line 29 through column 6, line 21. This and other pertinent prior art mechanisms include a series of contactors, electrically and mechanically interconnected and interrelated. (As used herein, the terms "contactor", "energizable contactor" and obvious derivatives thereof mean a relaylike mechanism, including a coil and at least one contact having a normal state, e.g., normally open, and all equivalents thereof. When the coil is energized by an electric current, the contact switches to the opposite state.)

In other words, the operation of each contactor in the regulating mechanism is dependent upon the operation or operational state of one or more of the other contactors therein. In the Pfarrer patent, for example, energization of the appropriate contactors for high speed compressor operation electrically and mechanically prevents energization of the low speed contactor. To achieve this interdependence, the apparatus includes complex interlocking electrical circuitry and mechanical coupling.

SUMMARY OF THE INVENTION

In a principal aspect, the present invention is an improved regulator for a two-speed motor (such as the compressor of an air conditioning unit). The motor may be part of any apparatus including a control mechanism which monitors certain conditions (such as area temperature) and requests, via signalling, operation of the motor at either speed.

The regulator includes a first or C1 energizable contactor having at least one C1 contact and a second or C2 energizable contactor having five C2 contacts. (The terms "C1" and "C2" are used herein solely to identify specific contactors and related contacts.) The C1 and C2 contactors are independent of one another from both an electrical and mechanical perspective. That is, the C1 and C2 contactors are not interlocked by electrical circuitry or mechanical coupling so as to prevent energization of one whenever the other is energized.

The C1 and C2 contactors are independently responsive to the control mechanism and cooperate to define a cycle/configure control. The cycle/configure control responsively cycles the motor, i.e., switches the motor between an inoperative "OFF" state and an operative "ON" state. The cycle/configure control also properly interconnects the motor windings and the lines delivering power to provide the requested low or high speed operation.

The present invention represents a substantial improvement over the prior art from the perspectives of simplicity, reliability, maintenance and costs. The improvement derives primarily from the independence and disassociation of one contactor from the other.

It is thus an object of the present invention to provide an improved, low cost regulator mechanism for a two-speed motor. Another object is a reliable regulating mechanism for a cooling apparatus, such as a heat pump or air conditioning unit. It is a further object of the present invention to provide a regulator mechanism for a two-speed motor utilizing independently-operated and disassociated contactors.

These and other features, objects and advantages of the present invention are described or apparent in the following description.

BRIEF DESCRIPTION OF THE DRAWING

A preferred embodiments of the present invention is described, in detail, with reference to the drawing wherein.

DETAILED DESCRIPTION OF A PREFERRED EMBODIMENT

A preferred embodiment of the present invention is shown in FIGS. 1-4 as regulator means 10 for regulating, in part, an air conditioning unit 12 and more particularly the speed of the compressor 14. The compressor 14 has a first or low speed and a second or high speed and operates on three-phase power. It is to be understood, however, that the regulator means 10 may be incorporated into any three-phase, two-speed motor.

Figure 1:
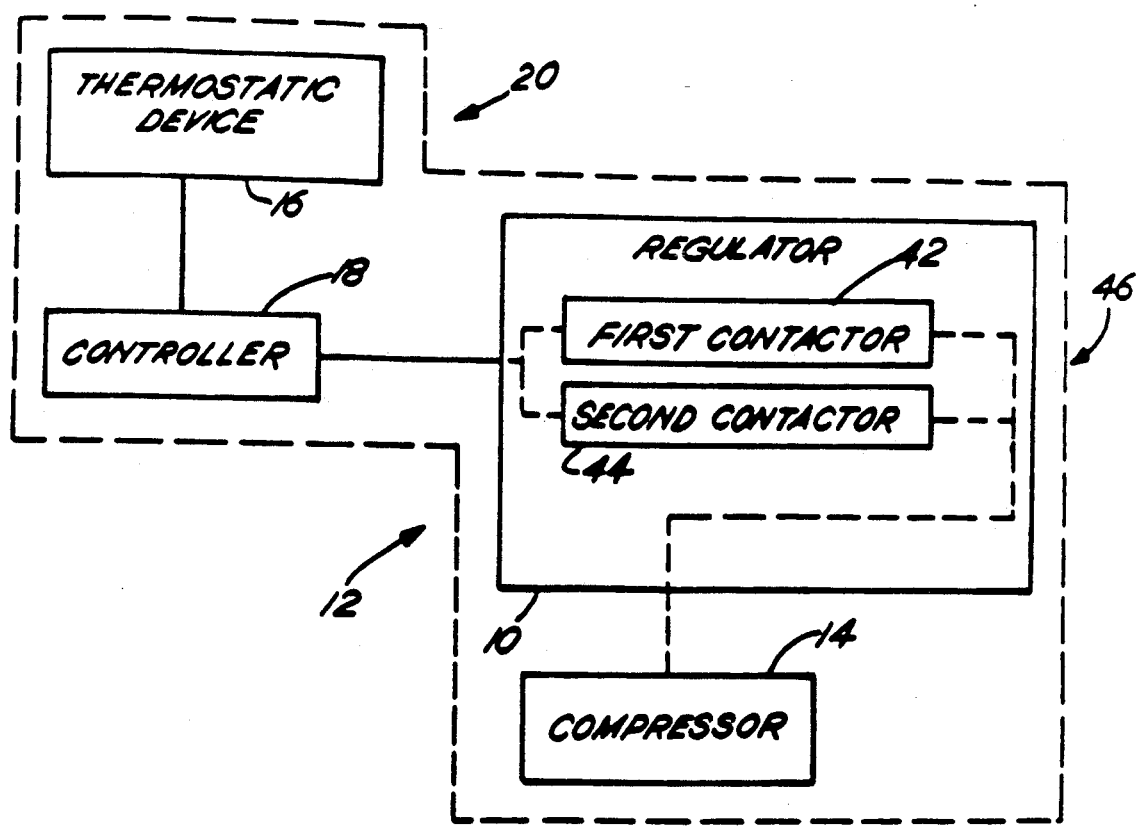
FIG. 1 is a partial schematic diagram of an air conditioning unit including a two-speed compressor, a controller and the present invention.

As best shown in FIG. 1, and as well known in the art, the air conditioning unit 12 includes a thermostatic device 16 within an area (not shown) to be conditioned. The thermostatic device 16 senses area temperature and accordingly provides a signal to a controller 18. The controller 18 responsively provides a signal representing a request for either low speed or high speed operation of the compressor 14, based upon the differential between the desired, set temperature and the actual area temperature.

The thermostatic means 16 and the controller 18 cooperate to define control means, generally designated 20. The control means 20 provides control signals to the regulator means 10 which represent requests for compressor operation at low or high speed.

Figure 2:
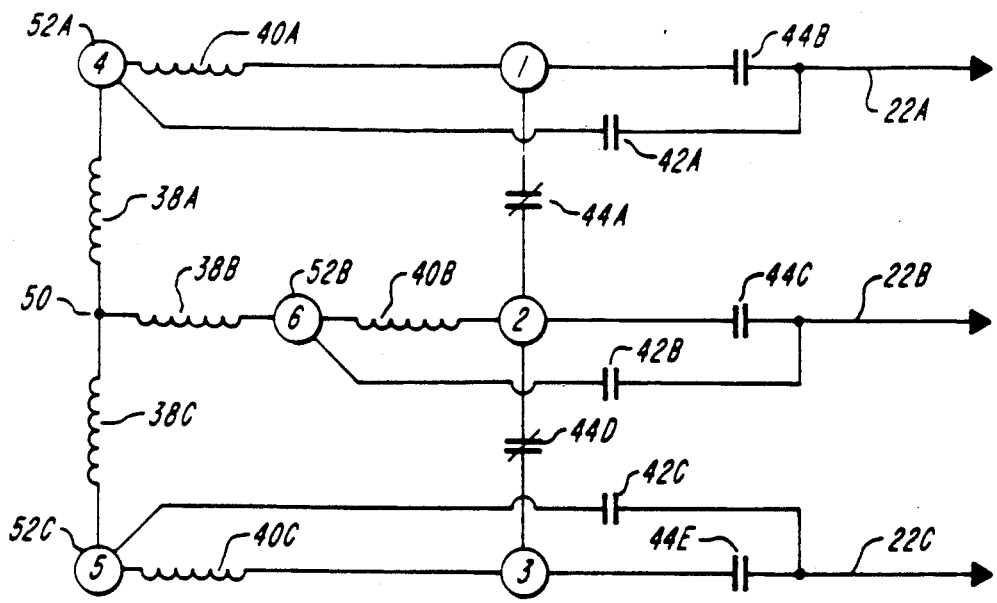
FIG. 2 is a partial electrical schematic diagram of the unit of FIG. 1 and illustrating a three-phase compressor.
Figure 3:
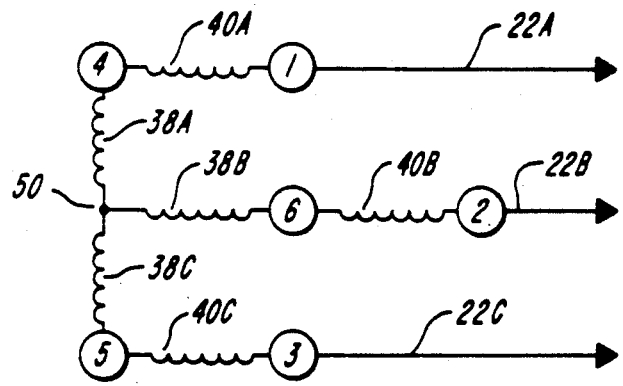
FIG. 3 is the schematic diagram of FIG. 2 simplified to illustrate the low speed configuration.
Figure 4:
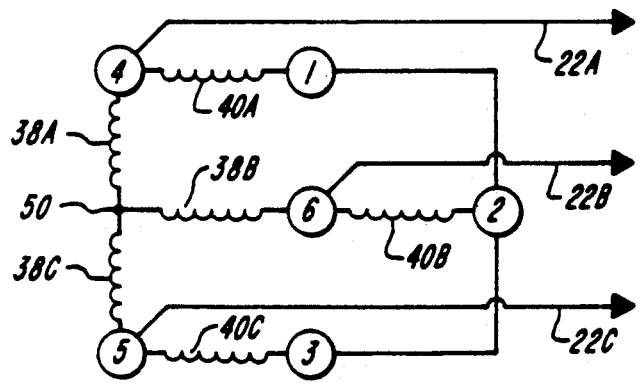
FIG. 4 is the schematic diagram of FIG. 2 simplified to illustrate the high speed configuration.

Referring now to FIGS. 1 and 2, the regulator means 10 includes a first or C1 contactor 42 and a second or C2 contactor 44. The C1 and C2 contactors 42, 44 are independent and disassociated, i.e., the contactors 42, 44 are not electrically or mechanically interrelated or interlocked. There is no circuitry to prohibit energization of either the C1 or C2 contactor 42, 44 whenever the other is energized, and there is no mechanical connection or coupling between the C1 and C2 contactors 42, 44 to provide such a prohibition.

The contactors 42, 44 define cycle/configure means, generally designated 46. The cycle/configure means 46 is responsive to signals from the control means 20, cycling the compressor 14 between an inoperative or OFF state and an operative or ON state and configuring the compressor 14 for low or high speed operation. More particularly, the cycle/configure means 46 responds to the control means 20 and properly configures the power lines 22A, 22B, 22C, primary windings 38A, 38B, 38C and secondary windings 40A, 40B, 40C.

Referring now to FIGS. 1-4, the air conditioning unit 12 includes a three-phase, two-speed compressor 14 and power is supplied over lines 22A, 22B, 22C, as is well known in the art. The compressor 14 itself includes a set of primary windings 38A, 38B, 38C and a set of secondary windings 40A, 40B, 40C, interconnected as shown. The compressor 14 is, in this preferred embodiment, a Model 2B (Three Phase), as marketed by Lennox Industries, Inc. (Dallas, Texas), and the encircled numbers in FIG. 2 represent terminals on that compressor model. As is also well known, use of three-phase power eliminates the need for (i) low and high speed starter windings operating in conjunction with a run capacitor and (ii) a starter capacitor and related circuitry.

In this preferred embodiment, the C1 contactor 42 includes normally-open contacts 42A, 42B, 42C, interconnected as shown. The C1 contactor 42 is energized by a HIGH SPEED signal from the control means 20 to provide the winding configuration and line interconnection shown in FIG. 4 (the C2 contactor 44 remaining de-energized).

The C2 contactor 44 is energized by a LOW SPEED signal from the control means 20 (the C1 contactor 42 remaining de-energized). The C2 contactor 44 includes normally-closed contacts 44A, 44D and normally-open contacts 44B, 44C, 44E. In the energized state, the C2 contactor 44 produces the winding configuration and line interconnection shown in FIG. 3.

More particularly, the three primary windings 38A, 38B, 38C are interconnected at a common node 50. The secondary windings 40A, 40B, 40C are connected to the primary windings 38A, 38B, 38C, respectively, so as to define first, second and third connection points 52A, 52B, 52C, respectively.

As shown in FIG. 2, the first C1 contact 42A interposes the first connection point 52A and first power line 22A. The second C1 contact 42B interposes the second connection point 52B and second power line 22B. The third C1 contact 42C interposes the third connection point 52C and third power line 22C.

The first C2 contact 44A interposes the first and second secondary windings 40A, 40B. The second C2 contact 44B interposes the first secondary winding 40A and first power line 22A. The third C2 contact 44C interposes the second secondary winding 40B and second power line 22B. The fourth C2 contact 44D interposes the second and third secondary windings 40B, 40C. The fifth C2 contact 44E interposes the third secondary winding 40C and third power line 22C.

Here again the first C1 contactor 42 and the second C2 contactor 44 properly cycle and configure the three-phase, two-speed compressor 14. The control means 18 selectively energizes the C1 contactor 42 and the C2 contactor 44 to interconnect primary windings 38A, 38B, 38C, secondary windings 40A, 40B, 40C, and power lines 22A, 22B, 22C so as to provide low and high speed operation of the compressor 14.

In this preferred embodiment, the normally-closed first and fourth C2 contacts 44A, 44D and the normally-open second, third and fifth C2 contacts 44B, 44C, 44E have a break-before-make relationship. This relationship exists in both switching directions such that the compressor 14 is always in either the low speed or high speed configuration before application of power.

A preferred embodiment has been described herein. It is to be understood that modifications and changes can be made without departing from the true scope and spirit of the present invention, which are defined by the following claims to be interpreted in view of the foregoing.

What is claimed is:

1. In an apparatus of the type including (i) a three-phase motor having operative and inoperative states, first, second and third primary windings, first, second and third secondary windings, and first and second speeds, (ii) control means for providing first and second speed control signals representing requests for operation of said motor at said first and second speeds, respectively, and (iii) first, second and third power lines, said first, second and third primary windings defining a common node, said first, second and third secondary windings connected to said first, second and third primary windings at first, second and third interconnection points, respectively, an improved regulating means comprising, in combination:

a C1 energizable contactor, coupled to said control means, having a first C1 contact, a second C1 contact and a third C1 contact, said first C1 contact interposing said first power line and said first interconnection point, said second C1 contact interposing said second power line and said second interconnection point, said third C1 contact interposing said third power line and said third interconnection point; and a C2 energizable contactor, coupled to said control means, having a first C2 contact, a second C2 contact, a third C2 contact, a forth C2 contact, and a fifth C2 contact, said first C2 contact interposing said first secondary windings, opposite said first interconnection point, and second secondary windings, opposite said second interconnection point, said second C2 contact interposing said first secondary winding, opposite said first interconnection point, and said first power line, said third C2 contact interposing said second secondary winding, opposite said second interconnection point, and said second power line, said forth C2 contact interposing said second secondary winding, opposite said second interconnection point, and third secondary windings, opposite said third interconnection point, said fifth C2 contact interposing said third secondary winding, opposite said third interconnection point, and said third power line;

said C1 energizable contactor, responsive to said control means, for cycling said motor between said inoperative state and said operative state and for selectively configuring said primary windings, said secondary windings, and said power lines in said operative state so as to provide said first speed of operation of said motor in response to said first speed control signal;

said C2 energizable contactor, responsive to said control means, for cycling said motor between said inoperative state and said operative state and for selectively configuring said primary windings, said secondary windings, and said power lines in said operative state so as to provide said second speed of operation of said motor in response to said second speed control signal.

2. An improved regulating means as claimed in claim 1 wherein said first, second and third C1 contacts are normally open.

3. An improved regulating means as claimed in claim 1 wherein said first and fourth C2 contacts are normally closed and said second, third and fifth C2 contacts are normally open.

4. An improved regulating means as claimed in claim 2 wherein said first and forth C2 contacts have a break-before-make relationship with said second, third and fifth C2 contacts.

5. An improved regulating means as claimed in claim 3 wherein said first and fourth C2 contacts have a break-before-make relationship with said second, third and fifth C2 contacts.

* * * * *